M. A. LAABS.
TESTING PROCESS.
APPLICATION FILED DEC. 10, 1917.
1,339,031. Patented May 4, 1920
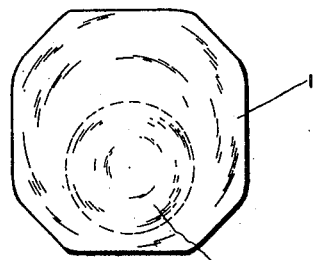
FIG. I
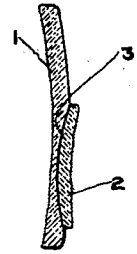
FIG. II
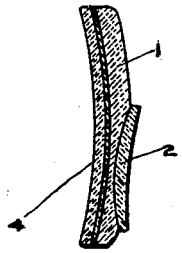
FIG. III
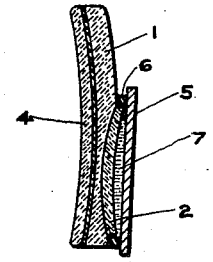
FIG. IV
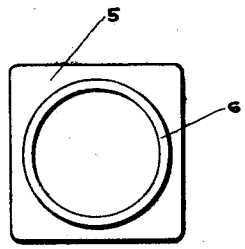
FIG. V
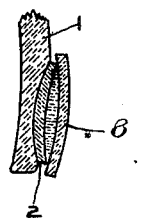
FIG. VI
INVENTOR
MAX A. LAABS
BY
H. H. Styll A. K. Parsons
ATTORNEYS

UNITED STATES PATENT OFFICE.

MAX A. LAABS, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

TESTING PROCESS.

1,339,031.   Specification of Letters Patent.   Patented May 4, 1920.

Application filed December 10, 1917. Serial No. 206,520.

*To all whom it may concern:*

Be it known that I, MAX A. LAABS, of Southbridge, in the county of Worcester and State of Massachusetts, have invented certain new and useful Improvements in Testing Processes, of which the following is a specification.

This instrument relates to improvements in means for testing lenses and has particular reference to a novel and improved means and apparatus whereby lenses in unfinished form may be readily tested to determine their optical properties.

One of the leading objects of the present invention is the provision of a novel and improved process or manner particularly adapted for use in the testing of molded or unfinished lenses to determine the optical or other properties of the lens before surfacing.

A further object of the present invention is the provision of a process of this character particularly adapted for use in the testing of fused bifocal lenses, in which one or more of the lens surfaces has been roughened or is unusable on account of heat effects.

Other objects and advantages of my improved lens testing instrument should be readily apparent by reference to the following specification taken in connection with the accompanying drawings, and it will be understood that I may make any modifications in the specific details of construction or manner of carrying out my invention, shown and described within the scope of the appended claims without departing from or exceeding the spirit of my invention.

Figure I represents a plan view of a blank of the character particularly adapted for testing with my improvement.

Fig. II represents a vertical sectional view therethrough.

Fig. III represents a detail view showing a test member applied to one face thereof.

Fig. IV is a similar view illustrating the test member as applied to the second face of the lens.

Fig. V represents a plan view of the second test member.

Fig. VI represents an enlarged fragmentary sectional view showing a slightly different cover plate for the segment.

In the drawings, the numeral 1 designates the major section of a lens having suitably secured thereto, as by fusion, the button 2, which is adapted to be secured, as in the countersink or recess 3, the method of uniting the parts of the lens, however, forming no part of my invention. It will be noted, however, by reference to Figs. I and II that the surface of the button is sometimes somewhat sunk in at the center, while the opposite face of the lens is roughened due to contact with the supporting block during the fusing operation, and it will be understood by those conversant with lenses that it is impossible to obtain any clear vision through such surfaces, but that in order to test out these surfaces it is necessary to in some way clear them up, as by surfacing or the like.

Frequently, however, and particularly under a press of labor conditions or the like, it is impossible to obtain satisfactory quantity production of the lenses, and it is necessary to subject each lens to grinding operation on both sides before its quality, focus or the like may be properly determined. It is, therefore, one of the principal purposes of the present invention to provide a novel and improved manner by which the surfaces may be temporarily cleared up without grinding. In the accomplishment of this result I form a suitable test glass 4 which is accurately ground to have substantially parallel faces and be entirely without power, but is ground to curved or meniscus form in order to accurately fit against the under or concave face of the blank 1, it being understood that should these faces be of different curves it is desirable to have a different blank or test member 4 for each curve in order that no power may be introduced into the lens through the use of the test member 4.

I then coat either the face of the lens or the test plate with a suitable solution having substantially the same refractive index as the major blank 1, a properly proportioned solution of glycerin and water or other transparent fluids being satisfactory for this purpose. The surface having been coated with the fluid I press the member 4 against the member 1, when it will fit tightly against the raised projections thereon and the spaces between the projections will be closed up by the fluid, rendering this face of the blank transparent and the capillary attraction between the face of the blank and adjacent face of the plate 4 being sufficient to retain the fluid in place, filling up the small pores or hollows during the testing operation.

With this arrangement it is then ordinarily possible to test the distance portion of the lens. The distance portion having been tested, or in the event that it is felt necessary to test only the bifocal portion, I then similarly compensate for the bending or other deficiencies in the segment. In this case, however, the segment is not always constant in size, and to secure most satisfactory results I, therefore, make use of the cover glass or test member 5 provided with the annulus 6, preferably of rubber or similar material, and I partially fill the cup thus formed with a suitable fluid as before, but having substantially the same index as the material from which the button 2 is formed, and then press this tightly down over the button, the annulus either fitting against the button, or as illustrated, fitting down around the edge of the button and making a tight seal with the major blank 1 to securely retain the fluid in position, as at 7. In this way the button in place of being irregular in shape and with a rough non-transparent surface is cleared up and rendered entirely transparent so that the combined lens and test plates may be together tried out with trial rings, lens testing instruments, neutralizing devices or the like and the exact power determined as well as the optical properties, without any grinding, and in a very rapid and efficient manner.

As is well known in the art, fused bifocal lens blanks are figured to produce a certain addition in the bifocal portion when a predetermined curve is ground on the bifocal face. For purposes of illustration we will assume this curve to be a plus 6 diopter. That is to say, with the lens shown in Figs. IV or VI for example, if a plus 6 diopter curve be ground on the bifocal face the reading addition provided by the segment will be a 2.50 diopter, which is considered the normal addition accomplished by that blank, although by charts furnished with the blanks it is possible to determine what other additions may be secured by different grindings of the blank, as for example the grinding of an 8.50 curve in place of a 6 curve would make a reading addition of 3 diopter in place of 2.50 diopter.

In the testing of the blank, however, it is desirable that the same be tested according to its proper or standard base curve, and to accomplish this result I may, therefore, make use of the test plate or cover glass 8 having its faces substantially a plus 6 diopter and a minus 6 diopter curve, although preferably being so calculated with respect to minus 6 diopter curve as to give the proper thickness allowance on account of the fact that with this glass in position and the liquid filler 7 between the glass and the face of the segment an extremely thick lens is provided. In this manner I am able to test the lens and get the same result from it as would be secured had the face been ground to a plus 6 diopter curve, and in this manner without any grinding and with the blank fresh from fusion, I am able to accurately determine the exact power of the blank and thus give much better service to the customer or wearer than is possible where it is necessary to grind the blank before it can be tested to determine the exactness of its power as well as the presence of defects which would make it unsatisfactory to use for a particular prescription.

I claim:

1. The process of testing a meniscus fused bifocal blank, consisting in forming a test glass with one face to fit the corresponding face of the lens, forming a transparent film on one of said parts, and pressing them together to fill up the inequalities of the lens to be tested, forming a second test glass with a cup and inner face of desired form, supplying liquid to the interior of the cup, and fitting the cup on the segment to retain the liquid thereon, and in connection with the cover glass produce the effect of desired upper face power or absence of power on the segment, whereby the entire structure will be transparent and capable of testing, substantially as described.

2. The process of testing a fused bifocal lens blank in accordance with a predetermined base curve, consisting in applying to the bifocal segment a cover glass, and interposing a liquid between the cover glass and segment whereby the cover glass and liquid will build up on the segment a liquid lens clearing up the roughness and inequalities of the segment, and building it up to the desired base curve to which the lens is to be tested.

3. The process of testing a bifocal lens blank, consisting in building up on the segment a liquid lens formed by a cover glass to the desired curve, and constructing the cover glass to effect the necessary compensation for thickness of the built up lens during the testing operation.

4. The process of testing a bifocal blank, consisting in shaping a cover glass to produce necessary thickness correction, applying the cover glass to the segment, and forming a liquid lens between the cover glass and segment, substantially as and for the purpose described.

5. The process of testing a fused bifocal lens blank, consisting in applying to the bifocal segment a cover glass and interposing a liquid between the cover glass and segment, whereby the cover glass and liquid will build up on the segment a liquid lens, clearing up the roughness and inequalities of the segment.

6. The process of testing a fused bifocal lens blank in its rough unpolished state, including applying thereto a cover glass and interposing a liquid between the cover glass and segment which will render the non-transparent unpolished surface of the glass transparent, the shape of the cover glass being such that the segment when so cleared up with the addition of the cover glass will have the value intended to be produced by subsequent grinding of the bifocal face of the lens.

In testimony whereof I have affixed my signature in presence of two witnesses.

MAX A. LAABS.

Witnesses:
H. E. COLEMAN,
ARTHUR S. CANN.